I. L. DAVIES.
TIRE PUMP.
APPLICATION FILED MAY 19, 1920.
1,417,805.
Patented May 30, 1922.
3 SHEETS—SHEET 1.
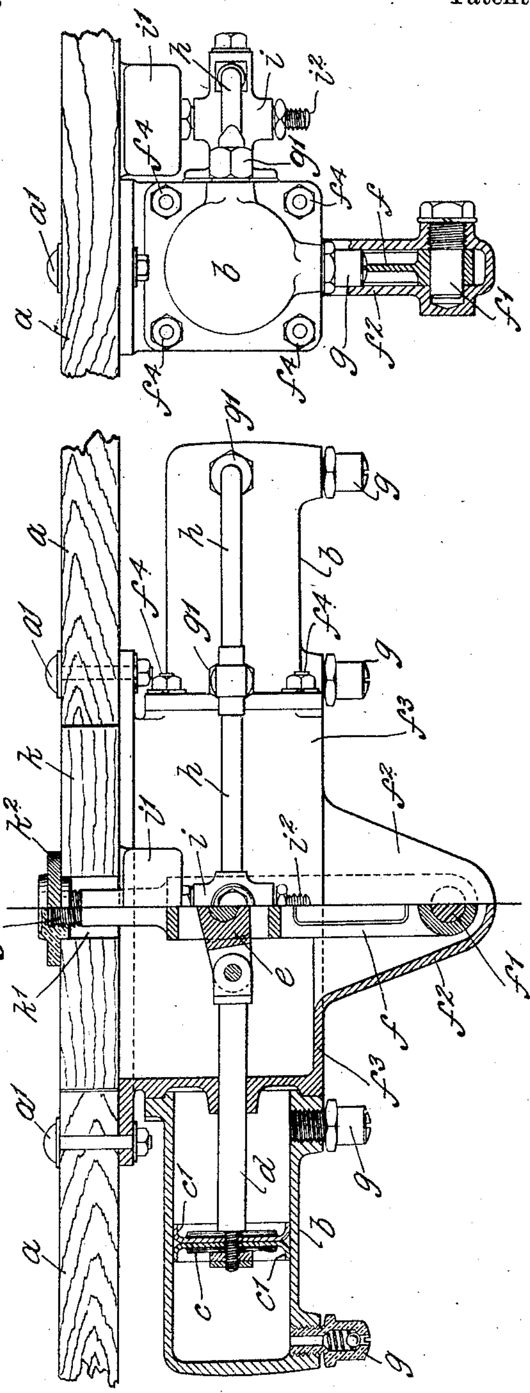
Inventor:
Ifor Llewelyn Davies.
Attorney:

I. L. DAVIES.
TIRE PUMP.
APPLICATION FILED MAY 19, 1920.
1,417,805. Patented May 30, 1922.
3 SHEETS—SHEET 2.
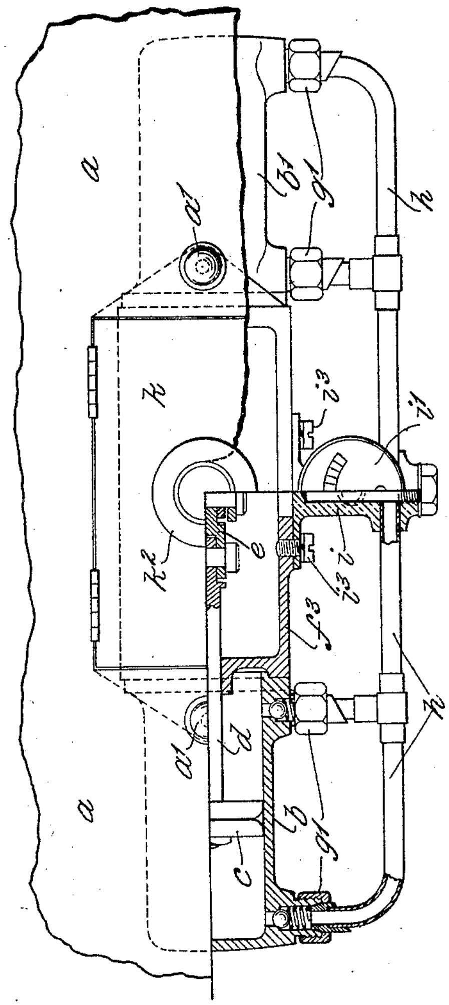
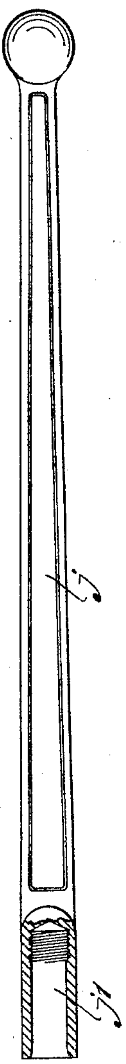
Inventor:
Ifor Llewelyn Davies.
Attorney: [signature]

I. L. DAVIES.

TIRE PUMP.

APPLICATION FILED MAY 19, 1920.

1,417,805. Patented May 30, 1922.

*Inventor:*

Ifor Llewelyn Davies.

*Attorney:* R. Haddan

UNITED STATES PATENT OFFICE.

IFOR LLEWELYN DAVIES, OF BLACKHEATH, ENGLAND.

TIRE PUMP.

1,417,805. Specification of Letters Patent. Patented May 30, 1922.

Application filed May 19, 1920. Serial No. 382,669.

*To all whom it may concern:*

Be it known that I, IFOR LLEWELYN DAVIES, of Blackheath, in the county of Kent, England, engineer, a subject of the King of Great Britain and Ireland, have invented certain new and useful Improvements in and Relating to Tire Pumps, of which the following is a specification.

This invention relates to tire pumps, and the object is to provide a simple and highly efficient device capable of being produced as a unitary structure and permanently applied as a fixture to any mechanically propelled road vehicle having pneumatic tires, the said device being capable of operation by hand and either from within the body of the vehicle or from the outside thereof, or from the ground.

Broadly stated, the invention consists of a pair or pairs of cylinders horizontally opposed to one another or arranged in tandem with a piston in each cylinder, a piston actuating member common to said cylinders and adapted for operation by hand and means for conveying compressed air from either side of each piston to a distributing chamber and thence to the tire.

The invention further comprises certain details of construction or arrangement of parts hereinafter described and specifically pointed out in appended claims with reference to the accompanying drawings, in which:—

Fig. 1 is a part side elevation, part vertical section of the improved pump applied to the footboard of a vehicle and with the cylinders opposed to one another.

Fig. 2 is an end view from the left of Fig. 1 with parts in section:

Fig. 3 is a part top plan view and part horizontal section with the footboard broken away:

Fig. 4 is a partial sectional detail view of an operating handle hereinafter referred to:

To refer more particularly to the structure shown in Figs. 1 to 4 of the drawings, the preferred position for the pump is on the underside of one of the footboards or running boards $a$ of the vehicle, suitable means for attachment such as bolts $a^1$ being provided. The pump itself shown comprises two cylinders $b$ $b^1$ horizontally opposed to one another, these cylinders each having within same a piston $c$ which may be provided with cup leathers $c^1$ or other appropriate form of packing and the rod $d$ of which is actuated through a connection shown as a connecting rod $e$ by means of a common lever conveniently positioned between adjacent ends of the cylinders. The lever $f$ is shown as fulcrumed on a pin $f^1$ mounted within a hollow extension $f^2$ of the crank casing $f^3$ to which the cylinders are connected as by bolts $f^4$.

When actuated, the pistons $c$ are caused to suck air through the anti-return valves $g$ and compress said air alternately in the cylinders $b$ $b^1$, the air passing therefrom through other anti-return valves $g^1$ disposed in each cylinder at opposite sides of the piston to effect double action. The compressed air passing said valves enters pipes $h$ leading to a distributing chamber $i$ shown as provided with a pressure gauge $i^1$ and from which chamber the air is conducted as from the outlet $i^2$ by flexible tubing (not shown) to the tire.

The chamber $i$ is shown as attached to the crank casing by screws $i^3$.

For the purpose of imparting movement to the lever $f$, the upper end of said lever is adapted to be engaged by a detachable handle shown as screw-threaded at $f^5$ for engagement by the interiorly threaded socket $j^1$ at the end of a detachable handle $j$ (Fig. 4). This handle may be normally retained in clips or other holding means which may be attached to the underside of the footboard or in other convenient or accessible place preferably outside the body of the vehicle but when required to operate the pump, the handle is removed from its holding means, a flap or pivoted portion $k$ of the footboard is raised disclosing the end of the lever $f$ and pressure gauge $i^1$ on the air distributing chamber $i$ and the handle $j$ is applied to the lever and worked or reciprocated in a direction parallel to the motion of the vehicle to produce the pumping action of the pistons, this operation being readily performed, if desired, by a person within the body of the vehicle. The said flap $k$ is shown as provided with an aperture $k^1$ to receive the end of the lever $f$ which is normally covered by means of a screw cap $k^2$ secured on to the threaded end of said lever.

Figure 6:
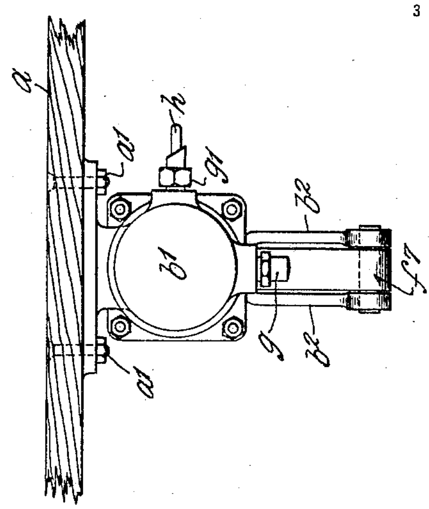
Fig. 6 is an end view of Fig. 5 from the left hand thereof.
Figure 5:
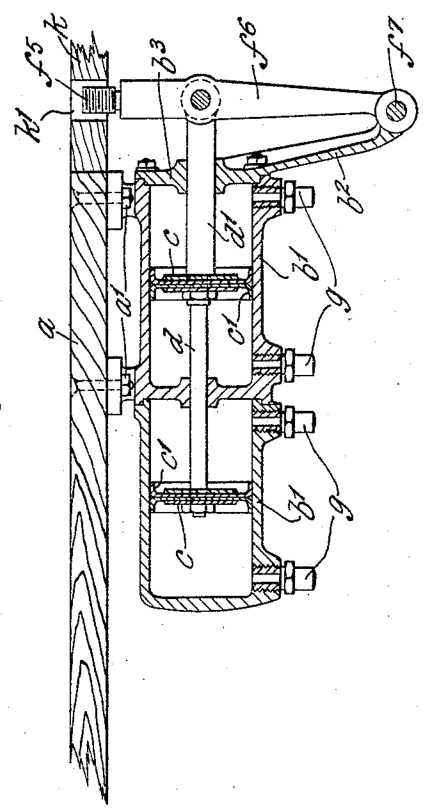
Fig. 5 is a vertical section showing a modification in which the cylinders are arranged in tandem.

To now refer to the modification shown in Figs. 5 and 6, the cylinders $b^1$ are here arranged in tandem and the piston actuating lever $f^6$ is located at one outer end of the cylinders, being shown as pivoted at $f^7$ in a bracket $b^2$ formed integrally with the cylinder cover $b^3$ and coupled to the adjacent piston by a rod $d^1$. The remaining reference characters designate similar parts to those shown in Figs. 1 to 3.

From the above description it will be apparent that I have provided a tire inflating device capable of application to a vehicle as a self-contained unit and capable of ready actuation without disturbing the occupants.

What I claim as my invention and desire to secure by Letters Patent of the United States is:—

1. A tire pump comprising cylinders disposed horizontally with their axes in alignment, a piston in each of said cylinders, a piston actuating member common to said cylinders and pistons, a detachable operating element adapted to be applied to said actuating member for manual operation thereof, means for conveying compressed air from each cylinder from opposite sides of the piston therein and a distributing chamber for receiving such compressed air from the cylinders and having an outlet for said air to a tire, in combination with a vehicle foot-board, a movable member in said foot-board adapted to be displaced to permit application of the operating element to the piston actuating member, and means for attaching the pump to said foot-board.

2. A tire pump comprising a plurality of cylinders, a piston in each cylinder, a piston actuating member common to the pistons of all the cylinders, a removable operating handle for operating the actuating member, and means for conveying the air compressed in said cylinders to a tire, in combination with a vehicle foot board on the under side of which the cylinders are mounted, and a movable member in the foot board adapted to be displaced to permit of application of the operating handle to the actuating member to effect operation of the actuating member.

3. An assembly of the character described embodying a vehicle running board provided with a door, a pump positioned on the under side of the running board adjacent the door and normally precluded from operation until the door is opened.

4. An assembly of the character described embodying a vehicle running board provided with a door, a pump positioned on the under side of the running board adjacent the door, and means for normally maintaining the door closed and for holding the pump parts against movement, until the door is released and opened.

5. An assembly of the character described embodying a vehicle running board, provided with a door, a pump positioned on the under side of the running board adjacent the door and having an actuating member, and means associated with the actuating member for maintaining the door closed to protect the pump when it is not in use.

In witness whereof I have signed this specification.

IFOR LLEWELYN DAVIES.